July 29, 1924.

H. G. LEE

GASOLINE GAUGE

Filed March 1, 1922

1,502,788

Inventor
Harry G. Lee,

By

Attorney

Patented July 29, 1924.

1,502,788

UNITED STATES PATENT OFFICE.

HARRY G. LEE, OF BOSTON, MASSACHUSETTS, ASSIGNOR OF ONE-THIRD TO LOUIS D. COVICH AND TWO-THIRDS TO DAVID FINKLESTEIN, BOTH OF BOSTON, MASSACHUSETTS.

GASOLINE GAUGE.

Application filed March 1, 1922. Serial No. 540,284.

*To all whom it may concern:*

Be it known that I, HARRY G. LEE, a citizen of the United States, residing at Boston, in the county of Suffolk and State of Massachusetts, have invented new and useful Improvements in Gasoline Gauges, of which the following is a specification.

The invention relates to a gasoline gauge.

The object of the present invention is to provide a simple, practical and efficient gasoline gauge of strong and durable construction, designed for indicating the level of gasoline in tanks or other containers wherever placed and particularly adapted for use on the dash or other portion of automobiles and other motor vehicles and equipped with a pivoted pointer and a scale for plainly and accurately indicating the level of gasoline within the gasoline tank of the machine.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings, in which like characters of reference designate corresponding parts in the several views:—

Figure 3:
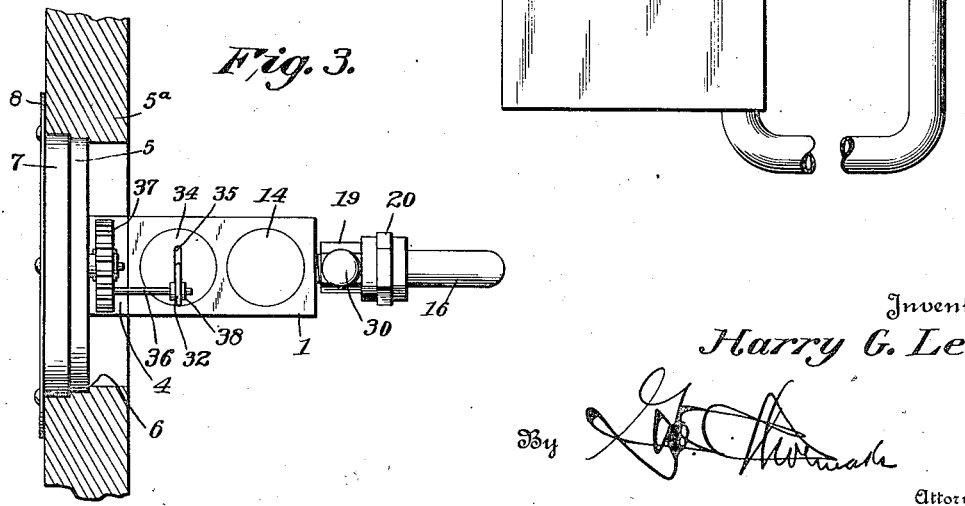
Figure 3 is a plan view of the gasoline gauge.
Figure 3:
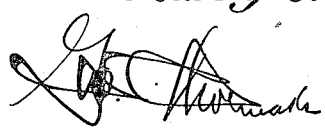

In the accompanying drawing, in which is illustrated the preferred embodiment of the invention, the gasoline gauge which, while being particularly adapted for use on automobiles and other motor vehicles, is also capable of general use for indicating the level of gasoline within a tank or other source of supply and it comprises in its construction a body 1 consisting of a casting of substantially oblong form provided with vertical or longitudinal chambers 2 and 3 and having at the top a horizontally projecting neck 4 and a vertical head 5 arranged in parallelism with the body 1 and spaced therefrom by the said neck 4 to enable the body to be arranged at one side of the dash 5ª of an automobile and the head 5 at the opposite side or face of the dash, the neck 4 being arranged in a slot or opening 6 of the dash, as clearly illustrated in Figure 3 of the accompanying drawing. The head, which is preferably circular, is also preferably fitted in the dash and it is equipped with a flanged rim 7 approximately L-shaped in cross section and suitably secured to the periphery of the head 5 and having its outwardly extending flange 8 forming a face plate and provided with perforations 9 for the reception of suitable fastening devices for securing the gauge to the dash. The gauge may be mounted on the dash or other portion of an automobile or other motor vehicle in any other desired manner.

Figure 1:
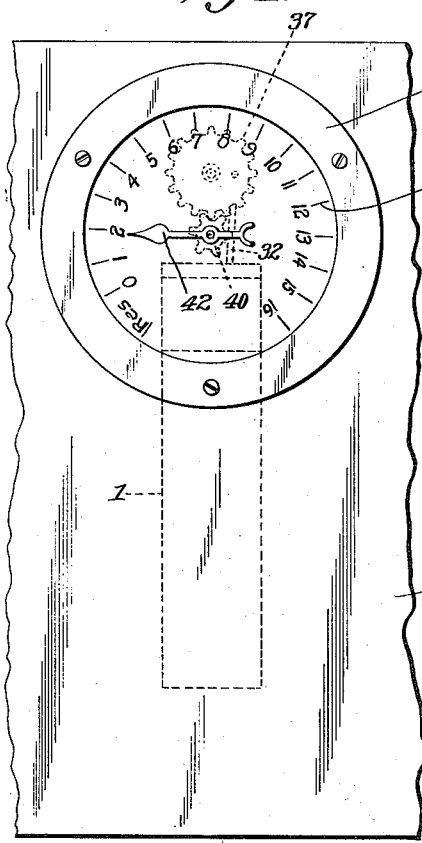
Figure 1 is a front elevation of a gasoline gauge constructed in accordance with this invention and shown to apply to the dash of an automobile.
Figure 2:
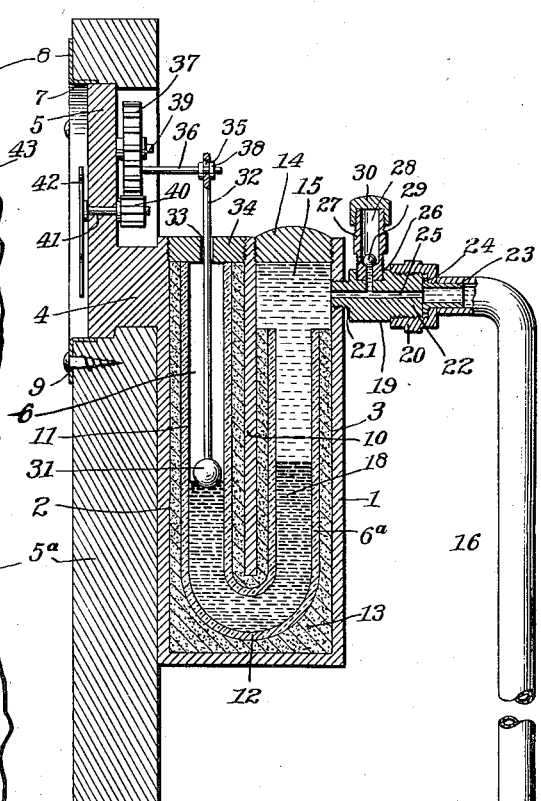
Figure 2 is a vertical sectional view of the same, the gasoline tank and the siphon tube being illustrated.

The wall 10 or intervening portion between the chambers 2 and 3 of the body 1 of the gasoline gauge terminates short of the lower end of the body and a glass tube of U-shape is mounted in the body, its bend or connecting portion 12 being arranged at the lower end of the body below the said wall or portion 10. One side or leg of the tube 11 is arranged in the chamber 2 and the other side or leg is arranged in the chamber 3 and the tube is preferably supported in position by a plaster of Paris 13 or other suitable plastic material which may be readily poured around the tube and which will rigidly hold the same in proper position within the body or casting 1. One of the walls of the body will be constructed separate and suitably secured to the body in order to enable the tube to be readily introduced into the body. The front side or leg of the tube 11 is extended above the rear side or leg which, with the plaster of Paris, terminates a short distance below the upper end of the chamber 3 to provide an intervening space between the upper end of the rear leg and a threaded closure plug 14 which is screwed into the upper end of the chamber 3, the latter being threaded for the reception of the closure plug 14, as clearly indicated in Figure 2 of the drawing. This intervening space 15 is for the purpose of providing a suitable connection between the upper end of the chamber 3 and a vacuum tube 16.

The siphon or vacuum tube 16 extends to and is connected with the bottom of a gasoline tank 17 so that variations in the amount of liquid within the gasoline tank or other source of supply will cause corresponding variations in a column of mercury 18 within the glass tube 11. The suction or vacuum tube 16 may be connected with the bottom of the tank 17 in any desired manner and the tank may be arranged in any suitable position below the plane of the bottom of the mercury tube 11 and the upper end of the suction or vacuum tube 16 is connected with the casting by means of a fitting comprising a tube 19 threaded into the body 1 and connected to the tube 16 by a union 20. The tube 19 is provided at one end with a reduced threaded portion 21, which is screwed into a suitably threaded aperture of the body 1 adjacent the upper end of the chamber 3 and the other end 22 of the tube 19 is of greater diameter than the threaded portion 21 and receives the union which secures the flanged nipple 23 to the pipe 19. The suction or vacuum tube is secured to the nipple 23 and the flange 24 of the nipple fits against the adjacent end of the pipe 19 and forms a ground joint therewith. The pipe 19 has a central polygonal portion and a relatively small bore or opening 25 and the said polygonal portion is provided with a threaded socket 26 communicating with the bore 25 and receiving a valve body 27. The valve body, which consists of a central polygonal portion and threaded terminals, has a bore or opening which is enlarged at the upper portion to provide a valve chamber 28 for the reception of a ball 29 which seats at the lower end of the valve chamber at the enlargement of the bore of the said body 27. The upper threaded end of the valve body is equipped with a removably threaded cap 30 adapted to be readily detached to permit a suction pump to be connected with the suction pipe or tube for exhausting the air therefrom to cause the gasoline from the tank to rise in the suction pipe or tube and fill the same and also the space 15 and the space within the rear leg of the mercury tube, above the mercury therein, to form a continuous liquid body from the rear leg of the mercury tube to the gasoline tank for transmitting the said variations in the depth of the gasoline within the tank. After the air has been completely exhausted from the rear leg 6 and the vacuum or suction tube the ball valve will be maintained automatically closed and will prevent the entrance of air into the suction or vacuum tube and the threaded cap 30, which is adapted to be screwed tightly against the upper end of the valve body will effectually prevent the entry of air even should the ball valve be jolted off its seat. The continuous body of liquid connecting the gasoline tank with the rear leg of the mercury column tends to pull the gasoline in the vacuum or siphon tube downward and variations in the amount of liquid within the tank will produce variations in the height of the column of mercury within the front leg of the mercury tube and as the gasoline within the storage tank is consumed the column of mercury in the front side or leg of the mercury tube will vary and will operate a float 31.

The float 31, which is preferably in the form of a glass bulb so as not to be affected by the mercury, is connected with the lower end of a rod 32 extending upwardly in the front side or leg of the mercury tube through a slot 33 in a closure plug 34 which is threaded into the upper end of the chamber 2, the body 1 being threaded for the reception of the threaded plug 34. The upper end of the rod 32 is provided with a slot or opening 35 through which passes an eccentric element 36 carried by a gear wheel 37 and provided at opposite sides of the rod with suitable collars or flanges 38 for maintaining the rod in proper position with relation to the end of the eccentric element 36. The eccentric element 36 consists of a horizontal rod or member and the gear wheel 37, which is mounted on a suitable stub shaft or pivot 39 meshes with a pinion 40 suitably secured to one end of a horizontal shaft 41 journaled in a central bearing opening in the circular head 5 and equipped at its upper or front end with an indicating pointer 42, which is movable over numbered graduations 43 of the said head. The numbers may be arranged on a dial or applied to the head in any other desired manner and the pivotal movement of the indicating hand or pointer 42 will register the variations in the height of the gasoline in the gasoline tank 17. Owing to the difference in the diameter in the large gear and in the small pinion a relatively small movement of the mercury column will be translated into a relatively great amount of movement of the indicating hand or pointer so that the latter, and its position with relation to the graduations, may be plainly seen by the operator of an automobile or other motor vehicle. As the gasoline gauge is located at a higher level than the liquid within the storage tank there will be a constant pull on the mercury column within the rear leg, due to the tendency of the action of the vacuum or suction tube to empty. Should the supply tank become entirely empty the mercury will hold the gasoline within the suction or siphon tube as the suction or siphoning action will not be sufficient to pull the mercury out of the legs of the mercury tube.

What is claimed is:

1. A gasoline gauge, including a body consisting of a casting provided at its top with front and rear openings and having an intervening wall or portion terminating short of the lower end of the body and forming two communicating chambers, a mercury tube of U-shape arranged in the said chambers and having its bend or connecting portion located below the said wall, plastic material surrounding the mercury tube and securing the same in position in the said openings, closure plugs secured in the said openings one of the plugs being provided with a slot, a float operating in the front opening and having a rod extending through the slot of the closure plug, a head or member having a pivoted indicating hand or pointer, gearing for transmitting motion from the float to the indicating hand or pointer and for increasing the said motion for causing the hand or pointer to move a greater distance than the float, and a suction or vacuum pipe connecting the gauge with a gasoline tank.

2. A gasoline gauge, including a body having front and rear chambers communicating at the bottom, a suction or vacuum pipe, a fitting connecting the suction or vacuum pipe with the rear leg or passage and provided at its upper portion with a socket, a valve body mounted in the socket and provided with a valve chamber, an automatic valve operating within the valve chamber, a cap for the valve body, indicating means located at the front leg or passage, and a suction or vacuum pipe connecting the gauge with a gasoline tank.

In testimony whereof I have hereunto set my hand.

HARRY G. LEE.